United States Patent
Snelten

(10) Patent No.: US 8,115,536 B2
(45) Date of Patent: Feb. 14, 2012

(54) SELF-OSCILLATING SWITCH CIRCUIT FOR USE IN A SWITCHING DC-DC CONVERTER

(75) Inventor: Jeroen Snelten, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 289 days.

(21) Appl. No.: 12/596,866

(22) PCT Filed: Apr. 21, 2008

(86) PCT No.: PCT/IB2008/051524
§ 371 (c)(1),
(2), (4) Date: Oct. 21, 2009

(87) PCT Pub. No.: WO2008/132652
PCT Pub. Date: Nov. 6, 2008

(65) Prior Publication Data
US 2010/0045204 A1 Feb. 25, 2010

(30) Foreign Application Priority Data
Apr. 27, 2007 (EP) ..................................... 07107160

(51) Int. Cl.
*G05F 1/10* (2006.01)
(52) U.S. Cl. ........ 327/538; 327/368; 327/365; 327/334; 323/312; 323/311; 323/315; 323/304; 315/247; 315/185 S; 315/291; 315/224
(58) Field of Classification Search .................. 327/538, 327/334, 345, 363, 365, 368, 401, 482, 483, 327/490; 323/304, 311, 312, 313–317; 315/247, 315/246, 225, 224, 209 R, 185 S, 291, 307
See application file for complete search history.

(56) References Cited

U.S. PATENT DOCUMENTS 3,987,424 A 10/1976 Brouwer et al.
5,801,581 A * 9/1998 Koizumi ........................ 327/538
(Continued)

FOREIGN PATENT DOCUMENTS

EP 1043189 A2 10/2000
(Continued)

OTHER PUBLICATIONS

Ossman: "Small DC-DC Converters:DC-DC Converters Under the Magnifying Glass"; Elektor Electronics, vol. 29, No. 317, Jan. 1, 2003, pp. 54-58.

*Primary Examiner* — Tuyet Thi Vo

(57) ABSTRACT

A self-oscillating switch circuit for amplitude modulation dimming for dimming a LED load. The self-oscillating switch circuit comprises a high-power input terminal (S2) for supplying a first power to the load and a low-power input terminal (S1) for supplying a second power to the load. The switch circuit further comprises a power switch semi-conductor device (Q1) configured for controlling a load current from at least one of the high-power input terminal (S2) and the low-power input terminal (S1) to the output terminal. A control semi-conductor device (Q2) is configured to control the power switch semi-conductor device (Q1) in response to a sensing voltage. The sensing circuit comprises a first sensing resistor (R1A) and a second sensing resistor (R1B) for generating the sensing voltage such that a load current has a predetermined first peak current level corresponding to the first power, when power is supplied to the high-power input terminal, and the load current has a predetermined second peak current level corresponding to the second power when power is supplied to the low-power input terminal.

11 Claims, 4 Drawing Sheets

U.S. PATENT DOCUMENTS

| | | |
|---|---|---|
| 6,239,585 B1 | 5/2001 | Buono |
| 6,873,111 B2 | 3/2005 | Ito et al. |
| 7,129,856 B2 | 10/2006 | Hering et al. |
| 2005/0200574 A1 | 9/2005 | Goto et al. |
| 2005/0231127 A1 | 10/2005 | Yamamoto et al. |
| 2005/0265039 A1 | 12/2005 | Lodhie et al. |
| 2006/0043901 A1 | 3/2006 | Ito et al. |

FOREIGN PATENT DOCUMENTS

| | | |
|---|---|---|
| JP | 09207662 A1 | 8/1997 |

* cited by examiner

SELF-OSCILLATING SWITCH CIRCUIT FOR USE IN A SWITCHING DC-DC CONVERTER

FIELD OF THE INVENTION

The present invention relates to a self-oscillating switch circuit for use in a switching DC-DC converter. Further, the present invention relates to a driver circuit for operating a load, the driver circuit comprising the self-oscillating switch circuit. In particular, the driver circuit is configured for driving a LED.

BACKGROUND OF THE INVENTION

In a known device comprising a LED or an OLED, an electronic switching driver is applied to provide a suitable load current to the (O)LED. Such a device may be a LCD display having a (O)LED backlight, an automotive light assembly, e.g. a rear combination light (RCL) or any other lighting device. Such an electronic switching driver is in general preferably a low-cost circuit.

A suitable low-cost switching driver circuit may be a known self-oscillating driver circuit. Such a switching driver circuit comprises a self-oscillating switch circuit. A known self-oscillating switch circuit is designed to operate in a critical mode, thereby allowing to provide a single power level to a load such as a LED. However, in a number of applications, e.g. in an automotive rear combination light (RCL), at least two power levels are desired. Referring to the exemplary rear combination light, a tail lighting mode and a break lighting mode are desired.

Further referring to the rear combination light, pulse width modulation (PWM) for dimming the LED in a tail lighting mode may result in undesirable artifacts. These artifacts may be such that drivers do not observe the lighting correctly, which may result in accidents.

OBJECT OF THE INVENTION

It is an object of the present invention to provide a self-oscillating switch circuit for use in a DC-DC converter, wherein at least two power levels may be provided to a load using amplitude modulation (AM).

SUMMARY OF THE INVENTION

The above object is achieved in a self-oscillating switch circuit according to claim 1 and a DC-DC converter in accordance with claim 9.

According to the present invention, a self-oscillating switch circuit for use in a switching DC-DC converter comprises an output terminal for supplying power to a load. Further, the self-oscillating switch circuit comprises a high-power input terminal for receiving power from a power supply in order to supply a first (high) power to the load and a low-power input terminal for receiving power from the power supply in order to supply a second (low) power to the load. Hence, depending on the input terminal at which power is supplied by the power supply, a relatively high power or a relatively low power is supplied to the load.

A power switch semi-conductor device having a control terminal, such as a transistor, is provided and configured for controlling a load current flowing between an input terminal and the output terminal. Further a control semi-conductor device is provided and coupled to the power switch semi-conductor device for supplying a control signal to the control terminal of the power switch semi-conductor device for controlling switching of the power switch semi-conductor device.

A sensing circuit is coupled to the control semi-conductor device for generating a sensing voltage. The control semi-conductor device is configured to switch the power switch semi-conductor device non-conductive, when the generated sensing voltage has a predetermined control voltage level. In order to enable to provide the at least two power levels, the sensing circuit comprises a first sensing resistor and a second sensing resistor for generating the sensing voltage, the sensing circuit being configured such that the sensing voltage has the predetermined control voltage level, when power is supplied to the high-power input terminal and the load current has a predetermined first peak current level; and such that the sensing voltage has the predetermined control voltage level, when power is supplied to the low-power input terminal and the load current has a predetermined second peak current level. The first peak current level corresponds to the first power; the second peak current level corresponds to the second power. Hence, depending on the input terminal at which power is supplied by the power supply, the sensing voltage reaches the predetermined control voltage level when a relatively high current level or when a relatively low current level is reached. Thus, the amplitude of the generated load current, and hence the supplied power, is limited depending on the input terminal at which power is supplied.

One or more of the semi-conductor devices may be a transistor, in particular a bipolar transistor or a field-effect transistor (FET), or any other suitable semi-conductor device.

In an embodiment, the power switch semi-conductor device has a power-switch load-current input terminal and a power-switch load-current output terminal. The first sensing resistor is coupled between the high-power input terminal and the power-switch load-current input terminal and the second sensing resistor is coupled to the low-power input terminal and is coupled to the power-switch load-current input terminal via the first sensing resistor. Thus, when power is supplied to the high-power input terminal, the load current flows through the first sensing resistor to the power switch semi-conductor device. The load current thus generates a voltage drop across the first sensing resistor. When the load current reaches the first peak current level, the voltage drop is substantially equal to the predetermined control voltage level. When power is supplied to the low-power input terminal, the load current flows through the second sensing resistor and the first sensing resistor to the power switch semi-conductor device. The load current thus generates a voltage drop across the first and the second sensing resistor. When the load current reaches the second peak current level, the voltage drop is substantially equal to the predetermined control voltage level and the power switch semi-conductor device is switched non-conductive, resulting in blocking the load current. It is noted that an actual current through the load may be maintained using an inductor and a freewheel diode as is known to the person skilled in the art.

In a further embodiment, a low-power input diode is connected to the low-power input terminal and a high-power input diode is connected to the high-power input terminal. A voltage leveling resistor is coupled between the low-power input terminal and the second sensing resistor for generating a voltage drop across the voltage leveling resistor, which voltage drop is substantially equal to a voltage difference in a forward voltage across the low-power input diode and a forward voltage across the high-power input diode. When power is simultaneously supplied to the low-power input terminal and the high-power input terminal, a forward voltage is generated across the low-power input diode and across the high-power input diode. Since a current flowing through the high-power input diode is higher than a current flowing through the low-power input diode, there is a forward voltage drop difference between said input diodes. The forward voltage drop difference results in a voltage across the second sensing resistor. A voltage across the second sensing resistor is part of the sensing voltage and consequently, the control voltage level would be reached before the first peak current level is reached. Thus, a third power level may be provided. However, if a low-power level and a high-power level are to be provided, for example in an automotive rear combination light, when power is supplied to both the low-power input terminal and the high-power input terminal, the high power level should be supplied to the load. Therefore, the voltage leveling resistor is introduced. The voltage drop across the voltage leveling resistor removes the voltage drop across the second sensing resistor. Since the voltage drop across the voltage leveling resistor is not a part of the sensing voltage, the first peak current level may be reached.

In an embodiment, the power switch semi-conductor device has a power-switch load-current input terminal and a power-switch load-current output terminal. The first sensing resistor is coupled between the high-power input terminal and the power-switch load-current input terminal. The second sensing resistor is coupled between the control semi-conductor device and a node between the first sensing resistor and the power-switch load-current input terminal. A first controllable switch device is coupled between a common terminal and a node between the second sensing resistor and the control semi-conductor device, wherein the first controllable switch device is configured to be switched conductive, when power is supplied to the low-power input terminal; non-conductive, when power is supplied to the high-power input terminal; and non-conductive, when power is supplied to both the high-power input terminal and the low-power input terminal. When the first controllable switch device is non-conductive, virtually no current flows through the second sensing resistor. Consequently, the sensing voltage is generated by the load current flowing through the first sensing resistor. When the first controllable switch device is conductive, a control current flows through the second sensing resistor, thereby generating a voltage across the second sensing resistor. Consequently, the sensing voltage is generated by the load current and the control current flowing through the first sensing resistor and in addition by the control current flowing through the second sensing resistor.

In order to improve the energy efficiency of the self-oscillating switch circuit and in order to enable a relatively high current without damaging the self-oscillating switch circuit, a gain semi-conductor device may be coupled between the power switch semi-conductor device and the control semi-conductor device for amplifying the control signal. By amplifying the control signal, the power switch semi-conductor device may switch faster from conductive to non-conductive. Since a relatively high current may be flowing through the power switch semi-conductor device, slow switching results in a relatively high power dissipation. Thus, faster switching results in lower power dissipation. Lower power dissipation improves the energy efficiency and allows a larger current through the power switch semi-conductor device.

The present invention further provides a load driver circuit for operating a load. The load driver circuit comprises a switching DC-DC converter circuit. The switching DC-DC converter comprises a self-oscillating switch circuit according to the present invention. In an embodiment, the switching DC-DC converter is selected from a group comprising a buck converter, a boost converter, a buck-boost converter and a flyback converter. In an embodiment, the load is a light emitting diode, LED.

BRIEF DESCRIPTION OF THE DRAWINGS

Hereinafter, the present invention is elucidated with reference to the appended drawings showing non-limiting embodiments and wherein.

DETAILED DESCRIPTION OF EXAMPLES

Figure 1:
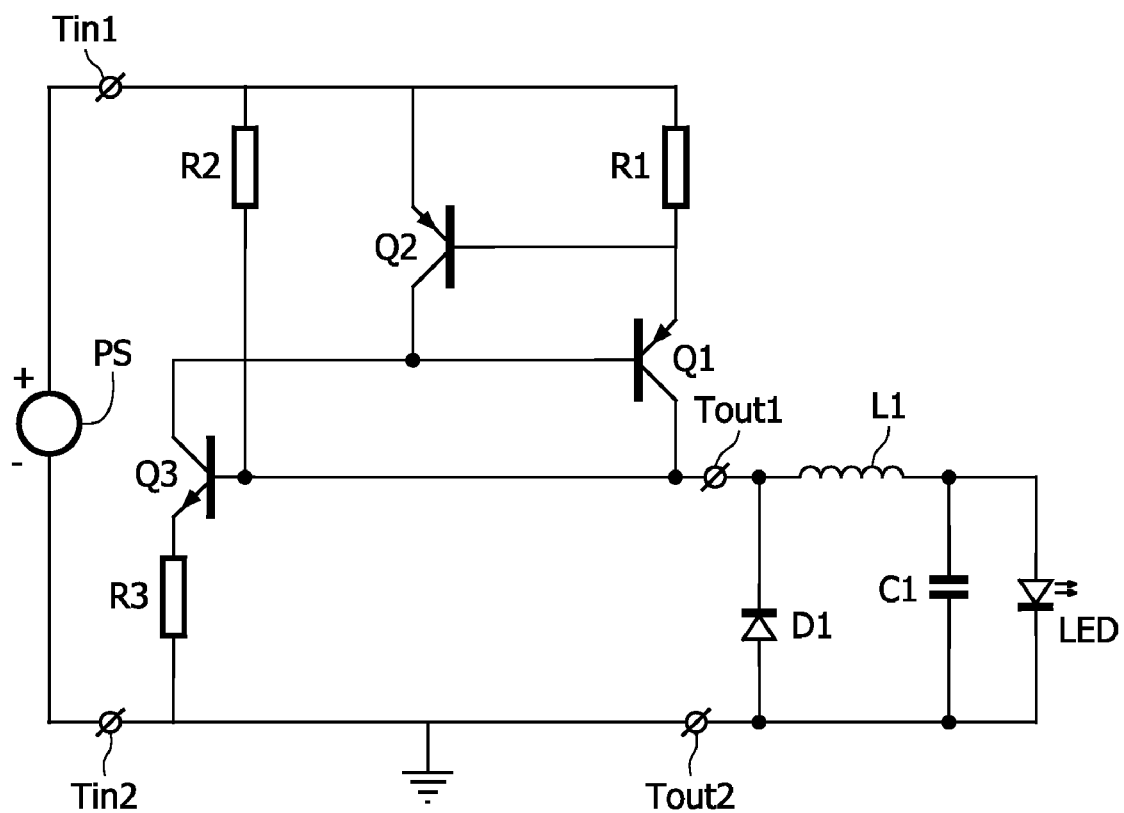
FIG. 1 shows a circuit diagram of a prior art self-oscillating switching DC-DC converter.

In the drawings, same reference numerals refer to same elements. FIG. 1 shows a circuit diagram of a prior art self-oscillating switch circuit comprised in a switching DC-DC buck converter 10. The self-oscillating switch circuit comprises a first and a second input terminal Tin1, Tin2. A DC power supply PS1 is coupled to the input terminals Tin1, Tin2 for supplying a DC voltage to the buck converter 10. The DC power supply PS1 may be any kind of DC power supply, e.g. a battery (pack). A light emitting diode LED is coupled to an output of the buck converter 10. The buck converter 10 further comprises an output inductor L1, an output capacitor C1 and a freewheel diode D1. The output capacitor C1 is coupled in parallel to the LED. The output inductor L1 is coupled in series with said parallel circuit of the output capacitor C1 and the LED. The freewheel diode D1 is connected in parallel to said series connection and the freewheel diode D1 is connected between a first and a second output terminal Tout1, Tout2 of the self-oscillating switch circuit.

The self-oscillating switch circuit comprises a power switch semi-conductor device, in particular a bipolar power switch transistor Q1. A collector of the power switch transistor Q1 is connected to the first output terminal Tout1 and an emitter of the power switch transistor Q1 is coupled via a sensing resistor R1 to the first input terminal Tin1 such that the power switch transistor Q1 is configured for controlling a load current between the input terminal Tin1 and the output terminal Tout1.

The self-oscillating switch circuit further comprises a first control semi-conductor device, in particular a first bipolar control transistor Q2. A base terminal, i.e. a control terminal, of the power switch transistor Q1 is coupled to a collector of the first control transistor Q2. An emitter of the first control transistor Q2 is coupled to the first input terminal Tin1. The base terminal of the first control transistor Q2 is coupled to the emitter of the power switch transistor Q1.

The self-oscillating switch circuit further comprises a second control semi-conductor device, in particular a second bipolar control transistor Q3. A collector of the second control transistor Q3 is coupled to the base terminal of the power switch transistor Q1 and the collector of the first control transistor Q2. An emitter of the second control transistor Q3 is coupled via a current-limiting resistor R3 to the second input terminal Tin2 and the second output terminal Tout2, which are all connected to ground and thus function as a common terminal of the circuit. A base terminal of the second control transistor Q3, i.e. a control terminal thereof, is connected to the first input terminal Tin1 via a start-up resistor R2 and is connected to the collector of the power switch transistor Q1 and is connected to the first output terminal Tout1.

In operation, at start-up, a DC supply voltage is supplied by the power supply PS1 to the first and second input terminals Tin1, Tin2. The supplied DC voltage is applied to the base terminal of the second control transistor Q3 through the start-up resistor R2. As a result, the second control transistor Q3 is switched conductive. AS a result, a collector current is generated and the power switch transistor Q1 becomes conductive. A load current is then enabled to flow from the first input terminal Tin1, through the sensing resistor R1, the power switch transistor Q1 and the output inductor L1 to the LED. Due to the inductor L1, the load current gradually increases.

With the increasing load current, an increasing voltage is generated over the sensing resistor R1. This increasing voltage results in an increasing base-emitter voltage on the first control transistor Q2. With the increasing base-emitter voltage, the first control transistor Q2 gradually becomes conductive, thereby gradually lowering a base-emitter voltage of the power switch transistor Q1. As the load current is flowing through the power switch transistor Q1, power is dissipated in the power switch transistor Q1, when the base-emitter voltage of the power switch transistor Q1 becomes below the saturation voltage. Eventually, the power switch transistor Q1 becomes non-conductive and the load current is blocked.

In the meantime, the inductor L1 maintains its current and a current starts to flow via the LED through the freewheel diode D1. As a result, a negative voltage is generated at the cathode of the freewheel diode D1, thereby switching the second control transistor Q3 non-conductive. Eventually, the current becomes too low and the freewheel diode D1 is switched non-conductive, removing the negative voltage at the base terminal of the second control transistor Q3. Subsequently, the supplied DC voltage from the first input terminal Tin1 is applied at the base terminal of the second control transistor Q3 and the above-described process is repeated thus providing self-oscillation.

Figure 2:
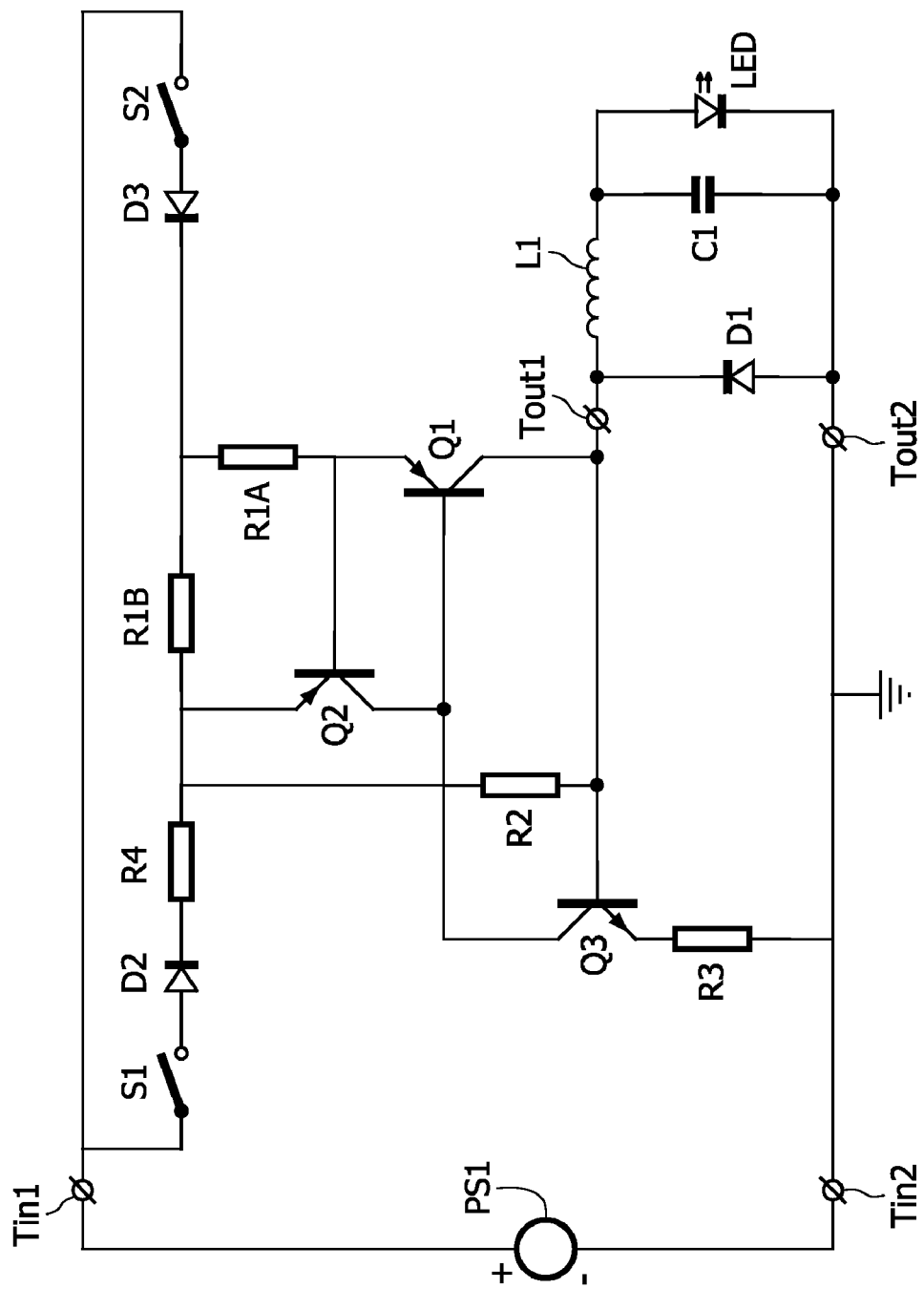
FIG. 2 shows a circuit diagram of a first embodiment of a self-oscillating switching DC-DC converter according to the present invention.

In accordance with an embodiment of the present invention as illustrated in FIG. 2, for operating the LED in a first intensity mode and a second intensity mode, e.g. a tail light and a break light, the self-oscillating switch circuit is provided with a first switch S1 and a second switch S2. The first switch S1 functions as a low-power input terminal and the second switch functions as a high-power input terminal. The first switch S1 is coupled via a low-power input diode D2 and a voltage leveling resistor R4 to the self-oscillating switch circuit. The second switch S2 is connected via a high-power input diode D3 to the self-oscillating switch circuit. Compared to the self-oscillating switch circuit as presented in FIG. 1, the sensing resistor (FIG. 1: R1) is embodied as a first sensing resistor R1A and a second sensing resistor R1B.

In the illustrated embodiment, the first sensing resistor R1A is connected between the high-power input terminal and a power switch load-current input terminal, i.e. an emitter, of the power switch transistor Q1. If power is supplied to the high-power input terminal, i.e. if the second switch S2 is conductive, the load current flows from the high-power input terminal through the first sensing resistor R1A and the power switch transistor Q1 to the inductor L1 and the LED. The load current flowing through the first sensing resistor R1A results in a sensing voltage across the first sensing resistor R1A being applied between the emitter and base of the first control transistor Q2. As the load current increases, the sensing voltage increases. When the load current reaches a first peak current level, the sensing voltage reaches a predetermined control voltage level. The predetermined control voltage level results in the first control transistor Q2 becoming conductive, which in turn results in switching the power switch transistor Q1 non-conductive, as described above in relation to FIG. 1.

The second sensing resistor R1B is connected between the low-power input terminal and the emitter of the power switch transistor Q1 via the first sensing resistor R1A. If power is supplied to the low-power input terminal, i.e. if the first switch S1 is conductive, the load current flows from the low-power input terminal through the second and the first sensing resistor R1B, R1A and the power switch transistor Q1 to the inductor L1 and the LED. The load current flowing through the first and second sensing resistor R1A, R1B results in a sensing voltage across the first and the second sensing resistor R1A, R1B being applied between the emitter and base of the first control transistor Q2. As the load current increases, the sensing voltage increases. When the load current reaches a second peak current level, the sensing voltage reaches the predetermined control voltage level. As described above, this results in the first control transistor Q2 becoming conductive and switching the power switch transistor Q1 non-conductive.

If, in operation, power is supplied to both the low-power input terminal and the high-power input terminal, a current flows from each input terminal. In particular, due to the forward voltage across the high-power input diode D3, a current flows from the low-power input terminal through the low-power input diode D2 and through the second sensing resistor R1B. The current flowing through the second sensing resistor R1B generates a voltage drop that adds to the sensing voltage. If a high power output is desired when power is supplied to both input terminals, the voltage across the second sensing resistor R1B is undesired. Therefore, the voltage-leveling resistor R4 is introduced. If a current flows from the low-power input, a voltage across the voltage leveling resistor R4 is generated, thereby lowering the voltage across the second sensing resistor R1B. Effectively, the current flowing from the high-power input terminal increases further compared to the current flowing from the low-power input terminal. So, the sensing voltage is substantially equal to the voltage generated across the first sensing resistor R1A. Consequently, the power switch transistor Q1 is switched non-conductive, when the load current is substantially equal to the first peak current level.

Figure 3:
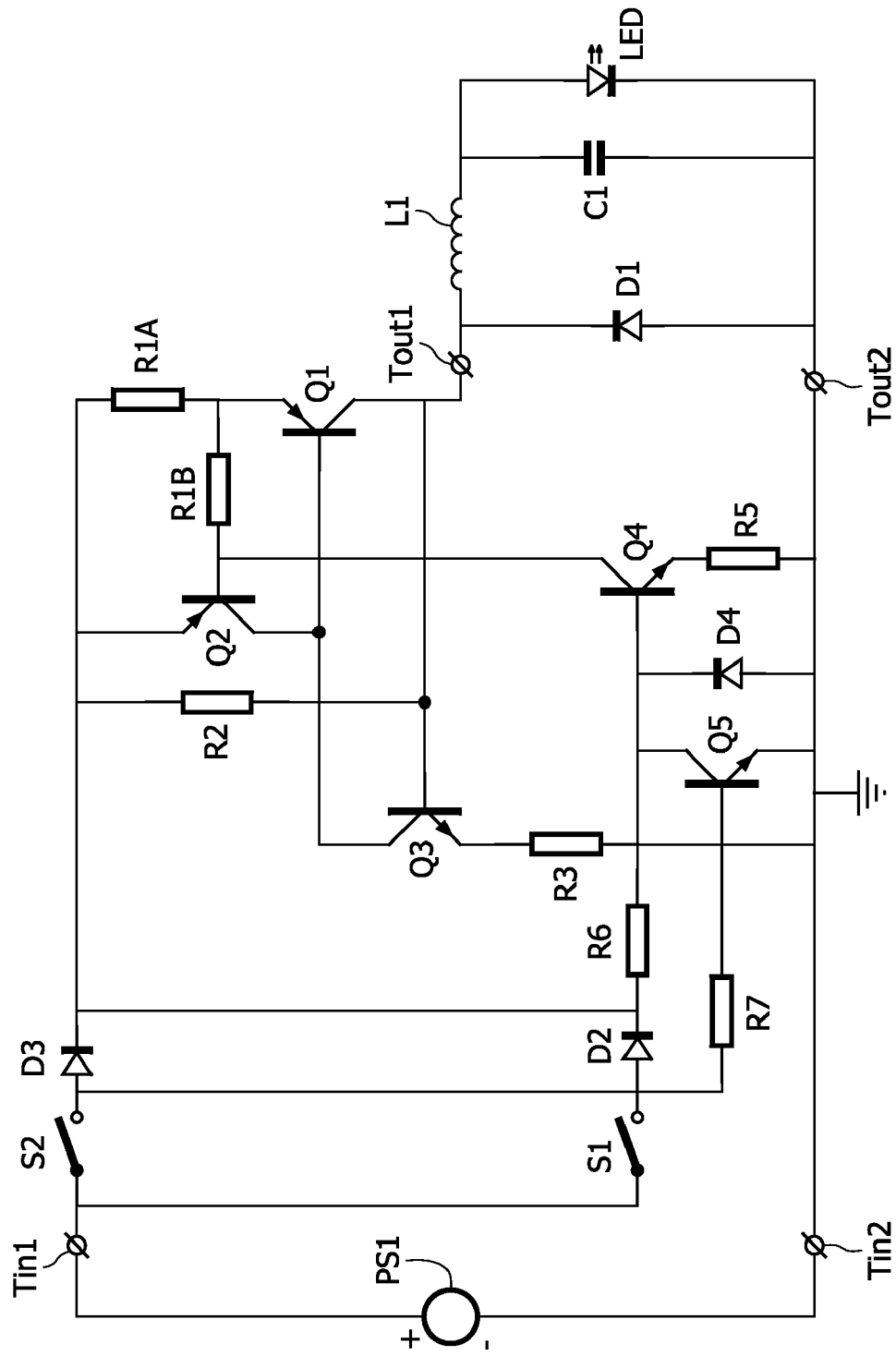
FIG. 3 shows a circuit diagram of a second embodiment of a self-oscillating switching DC-DC converter according to the present invention.

FIG. 3 illustrates a second embodiment of the present invention. In accordance with the present invention, a first sensing resistor R1A and a second sensing resistor R1B are provided. A first switch S1 is provided at a low-power input terminal and a second switch S2 is provided at a high-power input terminal. The first sensing resistor R1A is connected between the high-power input terminal and a power switch load-current input terminal, i.e. an emitter, of the power switch transistor Q1. The second sensing resistor R1B is coupled between a control terminal (base) of the first control transistor Q2 and a node between the first sensing resistor R1A and the emitter of the power switch transistor Q1. The base of the first control transistor Q2 is further connected to a switch element, in particular a collector of a first switch transistor Q4. The emitter of the first switch transistor Q4 is connected through a resistor R5 to a common terminal, in particular to ground. The base terminal of the first switch transistor Q4 is coupled through a resistor R6 to the low-power input terminal. Further, the base terminal of the first switch transistor Q4 is coupled through a zener diode D4 to the common terminal, in the illustrated embodiment being ground. In parallel with the zener diode D4, a second switch transistor Q5 is coupled. A base terminal of the second switch transistor Q5 is coupled via a resistor R7 to the high-power input terminal. The person skilled in the art readily recognizes a well-known circuit forming a current source (the current source is formed by the first switch transistor Q4, the zener diode D4, and the resistor R5). The current source is switchable by the second switch transistor Q5.

In operation, if power is supplied at the high-power input terminal, i.e. the second switch S2 being conductive, the load current flows from the high-power input terminal through the first sensing resistor R1A and the power switch transistor Q1 to the inductor L1 and the LED. The load current flowing through the first sensing resistor R1A results in a sensing voltage across the first sensing resistor R1A being applied between the emitter and base of the first control transistor Q2. As the load current increases, the sensing voltage increases. When the load current reaches a first peak current level, the sensing voltage reaches a predetermined control voltage level. The predetermined control voltage level results in the first control transistor Q2 becoming conductive, which in turn results in switching the power switch transistor Q1 non-conductive, as described above in relation to FIG. 1 and FIG. 2.

It is noted that, when power is supplied at the high-power input terminal, no voltage is applied at the base terminal of the first switch transistor Q4. Moreover, the voltage applied at the high-power input terminal is applied to the base terminal of the second switch transistor Q5, which therefore becomes conductive, thereby connecting the base terminal of the first switch transistor Q4 to ground. Thus, the first switch transistor Q4 is non-conductive and virtually no current flows through the second sensing resistor R1B. Therefore, the sensing voltage is substantially equal to the voltage across the first sensing resistor R1A.

If power is supplied at the low-power input terminal, i.e. the first switch S1 being conductive, the load current flows from the low-power input terminal through the first sensing resistor R1A and the power switch transistor Q1 to the inductor L1 and the LED. Further, with power being supplied at the low-power input terminal, the supply voltage is applied at the base terminal of the first switch transistor Q4. The actual voltage level is limited by the zener diode D4. No voltage is applied at the base terminal of the second switch transistor Q5, which therefore is non-conductive. Thus, the first switch transistor Q4 is conductive and a control current flows through the second sensing resistor R1B. Therefore, the sensing voltage is equal to the sum of the voltage across the first sensing resistor R1A and the voltage across the second sensing resistor R1B. The sensing voltage is applied between the emitter and base of the first control transistor Q2. As the load current increases, the sensing voltage increases. When the load current reaches a second peak current level (the second peak current level being lower than the first peak current level), the sensing voltage reaches the predetermined control voltage level. The predetermined control voltage level results in the first control transistor Q2 becoming conductive and in switching the power switch transistor Q1 non-conductive.

If power is applied at the high-power input terminal and the low-power input terminal simultaneously, the voltage at the low-power input terminal is applied at the base terminal of the first switch transistor Q4. However, since the voltage at the high-power input terminal is applied at the base of the second switch transistor Q5, the base of the first switch transistor Q4 is connected to ground and no control current flows through the second sensing resistor R1B. Hence, the load current increases until it reaches the first peak current level and, consequently, high power is supplied to the load, in particular the LED.

The current source formed by the first switch transistor Q4, the zener diode D4 and the resistor R5 ensures an inherently safe temperature dependency. The base-emitter voltage of the first switch transistor Q4 has a negative temperature dependency. Thus, with an increasing ambient temperature, the base-emitter voltage is lowered. As the base voltage is constant due to the zener diode D4, the emitter voltage is increased, resulting in a higher control current and thereby resulting in a smaller load current peak level. Therefore, the connected LED will not be overheated, when the ambient temperature increases. However, if desired, the person skilled in the art readily understands that the current source may be designed to be ambient temperature independent or to have a positive temperature dependency. In order to design the temperature dependency, the current source may be redesigned, as above mentioned, and/or the sensing circuit may be provided with a temperature dependent resistor like a NTC.

As mentioned above, power is dissipated in the power switch transistor Q1 due to the relatively slowly increasing control signal supplied from the collector of the first control transistor Q2 to the base terminal of the power switch transistor Q1. A faster increasing control signal would result in faster switching and thus in less power dissipation. Less power dissipation would allow a higher load current. Therefore, in an embodiment as illustrated in FIG. 4, a gain semiconductor device, in particular a gain transistor Q6, may be provided to amplify the control signal applied by the first control transistor Q2 to the power switch transistor Q1.

The gain transistor Q6 is connected with its collector to the base terminal of the first control transistor Q2, with its base terminal connected to the collector of the first control transistor Q2 and with its emitter connected to the base terminal of the power switch transistor Q1. It is noted here that the collector of the gain transistor Q6 may as well be connected to the positive terminal of the power supply. A gain resistor R8 is introduced between the base terminal of the gain transistor Q6 (and thereby the collector of the first control transistor Q2) and the base terminal of the power switch transistor Q1. Additionally, a delay capacitor C2 is coupled between the emitter (power-switch input terminal) of the power switch transistor Q1 and the collector (power-switch output terminal) of the power switch transistor Q1. Apart from the above-mentioned added components, the circuit as illustrated in FIG. 4 may be the same as one of the circuits as illustrated in FIG. 1, 2 or 3.

Figure 4:
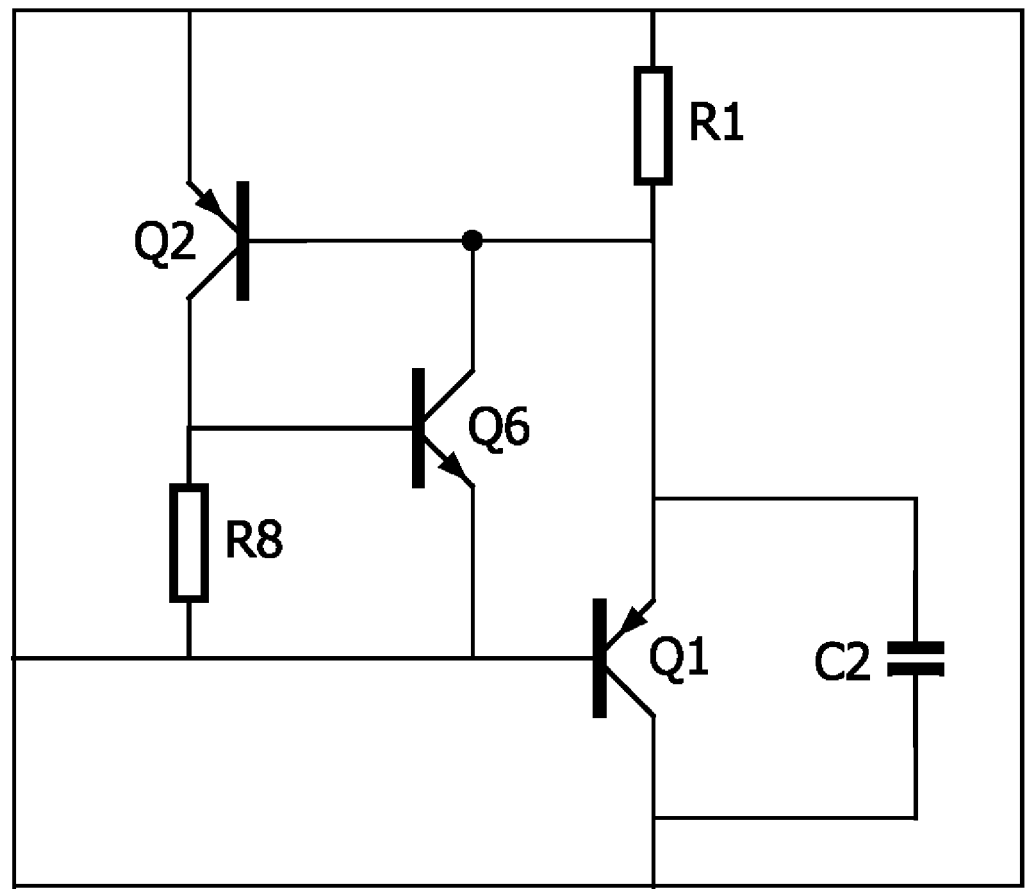
FIG. 4 shows a part of an embodiment of a self-oscillating switch circuit according to the present invention.

In operation, the circuit of FIG. 4 operates similar to the circuit of FIG. 1, for example. However, when the voltage over the sensing resistor R1 has become sufficiently high such that the first control transistor Q2 starts to conduct, the control signal output at the collector of the first control transistor Q2 is amplified by the gain transistor Q6. Thus, a small control signal that is output by the first control transistor Q2 rapidly becomes a relatively large control signal that is output by the gain transistor Q6. Consequently, due to the rapidly increasing control signal, the power switch transistor Q1 relatively rapidly switches to a non-conductive state. Thus, the power dissipation during switching is relatively low.

The delay capacitor C2 is as well operative to lower the power dissipation in the power switch transistor Q1. In particular when the power switch transistor Q1 is switched conductive, the delay capacitor C2 keeps the voltage across the collector and emitter of the power switch transistor Q1 relatively low. Consequently, the power dissipation, being equal to the current multiplied by the voltage, is low, since the voltage is low.

Although detailed embodiments of the present invention are disclosed herein, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Further, the terms and phrases used herein are not intended to be limiting; but rather, to provide an understandable description of the invention. The terms "a" or "an", as used herein, are defined as one or more than one. The term another, as used herein, is defined as at least a second or more. The terms including and/or having, as used herein, are defined as comprising (i.e., open language). The term coupled, as used herein, is defined as connected, although not necessarily directly, and not necessarily by means of wires.

The invention claimed is:

1. Self-oscillating switch circuit for use in a switching DC-DC converter, the self-oscillating switch circuit comprising:
    an output terminal (Tout1) for supplying power to a load (LED);
    a high-power input terminal (S2) for receiving power from a power supply (PS) in order to supply a first power to the load;
    a low-power input terminal (S1) for receiving power from the power supply in order to supply a second power to the load, the second power being lower than the first power;
    a power switch semi-conductor device (Q1) having a control terminal, the power switch semi-conductor device being configured for controlling a load current from at least one of the high-power input terminal and the low-power input terminal input terminal to the output terminal;
    a control semi-conductor device (Q2) coupled to the power switch semi-conductor device for supplying a control signal to the control terminal of the power switch semi-conductor device for controlling switching of the power switch semi-conductor device;
    a sensing circuit coupled to the control semi-conductor device for generating a sensing voltage, the control semi-conductor device being configured to switch the power switch semi-conductor device non-conductive when the sensing voltage has a predetermined control voltage level;
    wherein the sensing circuit comprises a first sensing resistor (R1A) and a second sensing resistor (R1B) for generating the sensing voltage, the sensing circuit being configured such that:
        the sensing voltage has the predetermined control voltage level, when power is supplied to the high-power input terminal and the load current has a predetermined first peak current level, the first peak current level corresponding to the first power;
        the sensing voltage has the predetermined control voltage level, when power is supplied to the low-power input terminal and the load current has a predetermined second peak current level, the second peak current level corresponding to the second power.

2. Self-oscillating switch circuit according to claim 1, wherein
    the power switch semi-conductor device has a power-switch load-current input terminal and a power-switch load-current output terminal;
    the first sensing resistor is coupled between the high-power input terminal and the power-switch load-current input terminal;
    the second sensing resistor is coupled between the control semi-conductor device and a node between the first sensing resistor and the power-switch load-current input terminal;
    a first controllable switch device (Q4) is coupled between a common terminal and a node between the second sensing resistor and the control semi-conductor device, wherein the first controllable switch device is configured to be switched:
        conductive, when power is supplied to the low-power input terminal,
        non-conductive, when power is supplied to the high-power input terminal; and
        non-conductive, when power is supplied to both the high-power input terminal and the low-power input terminal.

3. Self-oscillating switch circuit according to claim 1, wherein a gain semi-conductor device (Q6) is coupled between the power switch semi-conductor device and the control semi-conductor device for amplifying the control signal.

4. Self-oscillating switch circuit according to claim 1, wherein:
    the power switch semi-conductor device has a power-switch load-current input terminal and a power-switch load-current output terminal;
    the first sensing resistor is coupled between the high-power input terminal and the power-switch load-current input terminal; and
    the second sensing resistor is coupled to the low-power input terminal and is coupled to the power-switch load-current input terminal via the first sensing resistor.

5. Self-oscillating switch circuit according to claim 4, wherein:
    a low-power input diode (D2) is connected to the low-power input terminal;
    a high-power input diode (D3) is connected to the high-power input terminal;
    a voltage leveling resistor (R4) is coupled between the low-power input terminal and the second sensing resistor for generating a voltage drop that is substantially equal to a difference in a forward voltage across the low-power input diode and a forward voltage across the high-power input diode, when power is simultaneously supplied to the low-power input terminal and the high-power input terminal.

6. Self oscillating switch circuit according to claim 1, wherein at least one of the power switch semi-conductor device and the control semi-conductor device is a transistor.

7. Self-oscillating switch circuit according to claim 6, wherein the at least one of the power switch semi-conductor device and the control semi-conductor device is a bipolar transistor.

8. Self-oscillating switch circuit according to claim 6, wherein the at least one of the power switch semi-conductor device and the control semi-conductor device is a field-effect transistor, FET.

9. Load driver circuit for operating a load, the load driver circuit comprising a switching DC-DC converter circuit, the switching DC-DC converter comprising a self-oscillating switch circuit according to claim 1.

10. Load driver circuit according to claim 9, wherein the switching DC-DC converter is selected from a group comprising a buck converter, a boost converter, a buck-boost converter and a flyback converter.

11. Load driver circuit according to claim 9, wherein the load is a light emitting diode, LED.

* * * * *